US010854022B2

(12) United States Patent
Patil et al.

(10) Patent No.: US 10,854,022 B2
(45) Date of Patent: Dec. 1, 2020

(54) LOCATION BASED SENSOR SHARING

(71) Applicant: QUALCOMM Incorporated, San Diego, CA (US)

(72) Inventors: Shailesh Patil, Raritan, NJ (US); Junyi Li, Chester, NJ (US); Georgios Tsirtsis, London (GB); Libin Jiang, Bridgewater, NJ (US); Sudhir Baghel, Hillsborough, NJ (US); Kapil Gulati, Dover, DE (US); Zhibin Wu, Bedminster, NJ (US); Tien Viet Nguyen, Bridgewater, NJ (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/677,802

(22) Filed: Aug. 15, 2017

(65) Prior Publication Data

US 2018/0082493 A1 Mar. 22, 2018

Related U.S. Application Data

(60) Provisional application No. 62/396,456, filed on Sep. 19, 2016.

(51) Int. Cl.
*G07C 5/00* (2006.01)
*H04W 4/46* (2018.01)
(Continued)

(52) U.S. Cl.
CPC .............. *G07C 5/008* (2013.01); *H04Q 9/00* (2013.01); *H04W 4/023* (2013.01); *H04W 4/46* (2018.02);
(Continued)

(58) Field of Classification Search
CPC .......... H04Q 2209/00; H04Q 2209/10; H04Q 2209/20; H04Q 2209/40; H04Q 2209/50; H04Q 2209/80; H04Q 2209/82; H04Q 2209/84; H04Q 9/00; H04W 4/005; H04W 4/023; H04W 4/70; H04W 72/044;
(Continued)

(56) References Cited

U.S. PATENT DOCUMENTS 7,994,902 B2 * 8/2011 Avery .................... G08G 1/161
340/435
8,169,338 B2 5/2012 Mudalige
(Continued)

FOREIGN PATENT DOCUMENTS

CN 103544847 A 1/2014
CN 103745324 A 4/2014
(Continued)

OTHER PUBLICATIONS

International Search Report and Written Opinion—PCT/US2017/047155—ISA/EPO—dated Oct. 11, 2017.

*Primary Examiner* — Franklin D Balseca
(74) *Attorney, Agent, or Firm* — Patterson+ Sheridan, L.L.P.

(57) ABSTRACT

Aspects of the present disclosure relate to wireless communications and, more particularly, to techniques for sharing sensor information. The techniques may be practiced, for example, in a vehicle to vehicle (V2V) environment, where frequency resources are mapped based on vehicle location(s).

20 Claims, 10 Drawing Sheets

(51) Int. Cl.
*H04W 72/02* (2009.01)
*H04Q 9/00* (2006.01)
*H04W 4/02* (2018.01)
*H04W 4/38* (2018.01)
*H04W 72/04* (2009.01)
*H04W 4/70* (2018.01)

(52) U.S. Cl.
CPC ........ *H04W 72/02* (2013.01); *H04Q 2209/40* (2013.01); *H04Q 2209/80* (2013.01); *H04W 4/38* (2018.02); *H04W 4/70* (2018.02); *H04W 72/048* (2013.01)

(58) Field of Classification Search
CPC ......... H04W 72/0446; H04W 72/0453; H04W 72/08; H04W 4/04; H04W 72/02; H04W 72/048; H04W 4/46; H04W 4/38; G07C 5/00; G07C 5/008; G08G 1/16; G08G 1/161; G08G 1/163; G08G 1/166
See application file for complete search history.

(56) References Cited

U.S. PATENT DOCUMENTS

| | | | | |
|---|---|---|---|---|
| 8,494,513 B2* | 7/2013 | Kim | ...................... | H04W 72/02 370/236 |
| 8,942,412 B2* | 1/2015 | Basso | ..................... | G06F 3/005 382/100 |
| 9,058,703 B2 | 6/2015 | Ricci | | |
| 9,107,092 B2* | 8/2015 | Agarwal | ............. | H04W 64/006 |
| 9,148,755 B2* | 9/2015 | Mueck | .................. | H04W 16/14 |
| 9,250,083 B2 | 2/2016 | Czompo et al. | | |
| 9,312,929 B2* | 4/2016 | Forenza | ................ | H04B 7/024 |
| 9,313,778 B2* | 4/2016 | Ihara | ..................... | H04W 16/14 |
| 9,418,554 B2* | 8/2016 | Velusamy | ............... | H04W 4/70 |
| 9,473,830 B2* | 10/2016 | Heo | ......................... | H04Q 9/00 |
| 9,763,253 B2* | 9/2017 | Grant | ................ | H04B 7/18539 |
| 9,865,168 B2* | 1/2018 | Naserian | ................ | G08G 1/161 |
| 10,142,966 B2* | 11/2018 | Itagaki | .................. | H04W 72/02 |
| 2009/0207769 A1* | 8/2009 | Park | ..................... | H04W 74/04 370/311 |
| 2010/0225464 A1 | 9/2010 | Oda | | |
| 2012/0290674 A1* | 11/2012 | Feng | .................. | H04W 40/246 709/206 |
| 2014/0302774 A1 | 10/2014 | Burke et al. | | |
| 2015/0161425 A1 | 6/2015 | Atherton et al. | | |
| 2016/0212596 A1 | 7/2016 | Brahmi et al. | | |
| 2016/0234654 A1 | 8/2016 | Tosa et al. | | |
| 2017/0289317 A1* | 10/2017 | Seemann | ................ | H04L 12/12 |
| 2018/0373236 A1* | 12/2018 | Ewert | .................... | H04W 4/70 |

FOREIGN PATENT DOCUMENTS

| | | |
|---|---|---|
| WO | 2012154864 A1 | 11/2012 |
| WO | 2014153501 A1 | 9/2014 |

* cited by examiner

LOCATION BASED SENSOR SHARING

CLAIM OF PRIORITY UNDER 35 U.S.C. § 119

The present Application for Patent claims benefit of U.S. Provisional Patent Application Ser. No. 62/396,456, filed Sep. 19, 2016, assigned to the assignee hereof and hereby expressly incorporated by reference herein.

BACKGROUND

Field of the Disclosure

Aspects of the present disclosure generally relate to wireless communication and, more particularly, to schemes for sharing sensor information between devices (e.g., vehicles).

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

Such technologies have been applied to enable wireless communication services in vehicles. In fact, a "connected vehicle" is already a mainstream reality. In some cases vehicles can communicate with each other, which is commonly referred to as vehicle to vehicle (V2V) communications. In such cases, V2V communications may involve sharing of sensor information (such as camera, radar, or other sensor information) between vehicles which may help promote safety or enhance traffic flow. The potentially high number of vehicles involved in V2V and the high mobility of such vehicles presents challenges.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure generally relate to transmission schemes for sharing sensor information between vehicles.

Certain aspects of the present disclosure provide a method that may be performed, for example, by a communication device integrated in or installed on a vehicle. The method generally includes determining, based a given location, a set of frequency resources to be used for transmitting sensor information obtained at one or more vehicles for that given location, and utilizing the set of frequency resources to transmit sensor information or monitor for sensor information.

Aspects generally include methods, apparatus, systems, computer program products, and processing systems, as substantially described herein with reference to and as illustrated by the accompanying drawings.

Other aspects, features, and embodiments of the present invention will become apparent to those of ordinary skill in the art, upon reviewing the following description of specific, exemplary aspects of the present invention in conjunction with the accompanying figures. While features of the present disclosure may be discussed relative to certain aspects and figures below, all embodiments of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method aspects it should be understood that such exemplary aspects can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
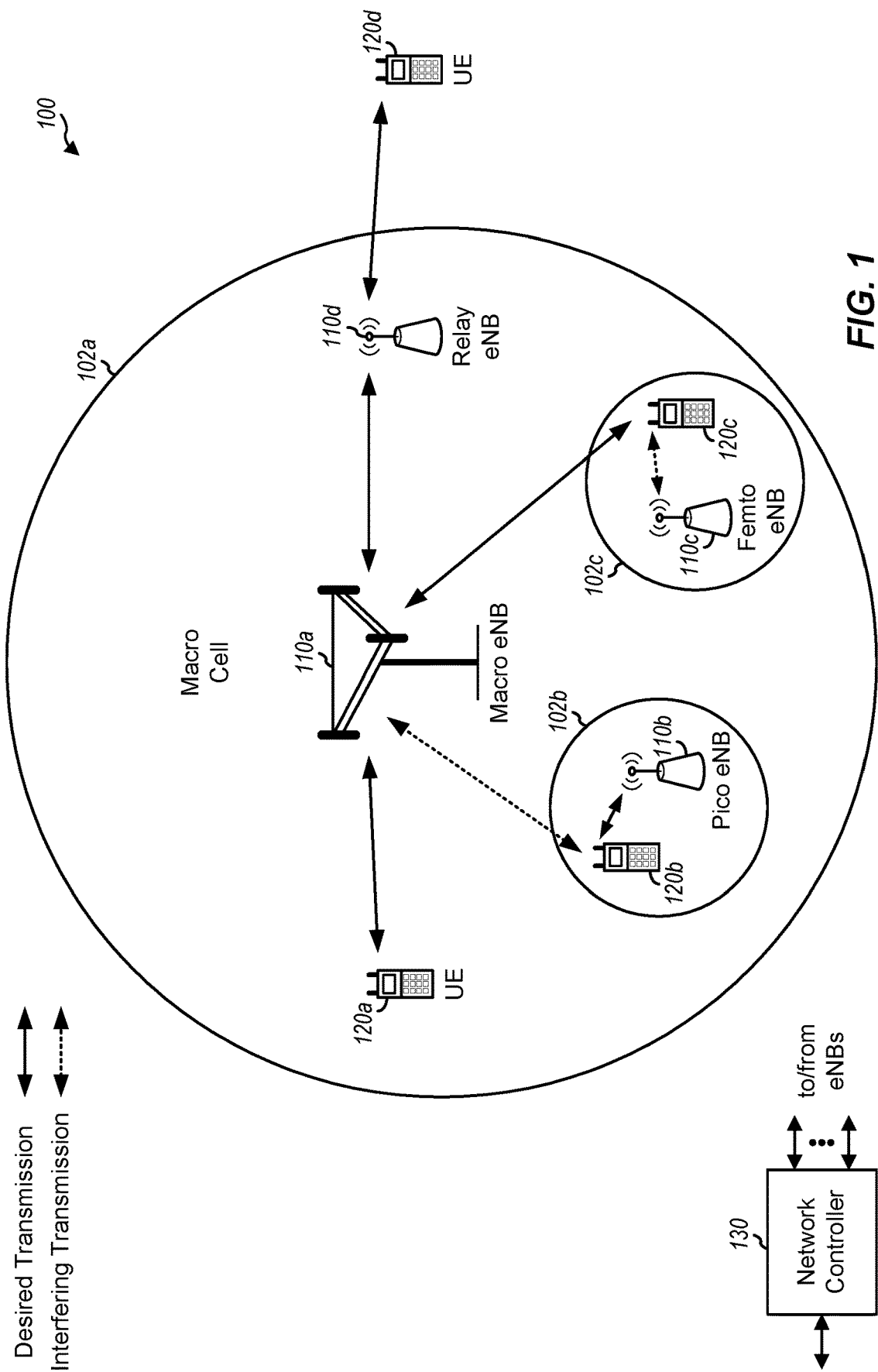
FIG. 1 illustrates an example of a wireless communication network, in accordance with certain aspects of the present disclosure.

Aspects of the present disclosure provide techniques for sharing sensor data. Such techniques may be applied, for example, to share common sensor data between vehicles in V2V applications.

In some cases, the techniques may leverage what may be referred to as new radio (NR) technology. As described herein, in NR, a large number of antennas may be equipped at the base station (BS) (e.g., Node Bs (NBs), access points (APs), smart radio heads (SRHs), transmit receive points (TRPs), NR BSs, 5G NBs, etc.) and user equipment (UE) sides. As a result, downlink and uplink transmissions using beam forming may be supported.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as NR (e.g., 5G radio access) global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communication technology under development in conjunction with the 5G Technology Forum (5GTF). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

While aspects may be described herein using terminology commonly associated with 3G and/or 4G wireless technologies, aspects of the present disclosure can be applied in other generation-based communication systems, such as 5G and later, including NR technologies.

Example Wireless Communications Network

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided. FIG. 1 illustrates an example wireless communication network 100, in which aspects of the present disclosure may be practiced. Techniques presented herein may be used for transmission scheme management for common channels in new radio (NR).

For example, a base station 110 (e.g., which may be a (e.g., a transmission reception point (TRP), Node B (NB), 5G NB, access point (AP), NR BS, etc.) may signal an indication to a user equipment (UE) 120 of whether the BS will transmit using beam repetition or beam sweeping, and can also send an indication of symbol index information. Based on the indication, the UE 120 can perform channel acquisition, decode transmissions from the BS, and/or determine symbol locations in the subframe.

The network 100 may be a long term evolution (LTE) network or some other wireless network, such as a NR or 5G network. According to certain aspects, wireless network 100 may include one or more other networks, such as a NR network. Wireless network 100 may include a number of Node Bs (e.g., eNBs, 5G Node Bs, TRPs, etc.) 110 and other network entities (e.g., although not shown, the network 100 may include a central unit (CU) and distributed units (DUs)).

In NR systems, the term "cell" and Node B, 5G NB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the access network 100 through various types of backhaul interfaces such as a direct physical connection, a virtual network, or the like using any suitable transport network.

A Node B is an entity that communicates with user equipments (UEs) and may also be referred to as a base station, an eNB, an access point, a distributed unit, a TRP, etc. Each Node B may provide communication coverage for a particular geographic area. In 3GPP, the term "cell" can refer to a coverage area of a Node B and/or a Node B subsystem serving this coverage area, depending on the context in which the term is used.

A Node B may provide communication coverage for a macro cell, a pico cell, a femto cell, and/or other types of cell (e.g., ACells and/or DCells). A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A Node B for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. A Node B may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., a Node B or a UE) and send a transmission of the data to a downstream station (e.g., a UE or a Node B). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes a Node B of different types, e.g., macro a Node B, pico a Node B, femto a Node B, relay a Node B, etc. These different types of a Node B may have different transmit power levels, different coverage areas, and different impact on interference in wireless network 100. For example, macro a Node B may have a high transmit power level (e.g., 5 to 40 Watts) whereas pico a Node B, femto a Node B, and relay a Node B may have lower transmit power levels (e.g., 0.1 to 2 Watts).

A network controller 130 may couple to a set of a Node B and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. In FIG. 1, a solid line with double arrows indicates desired transmissions between a UE and a serving Node B, which is a Node B designated to serve the UE on the downlink and/or uplink. A dashed line with double arrows indicates potentially interfering transmissions between a UE and a Node B.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

Figure 2:
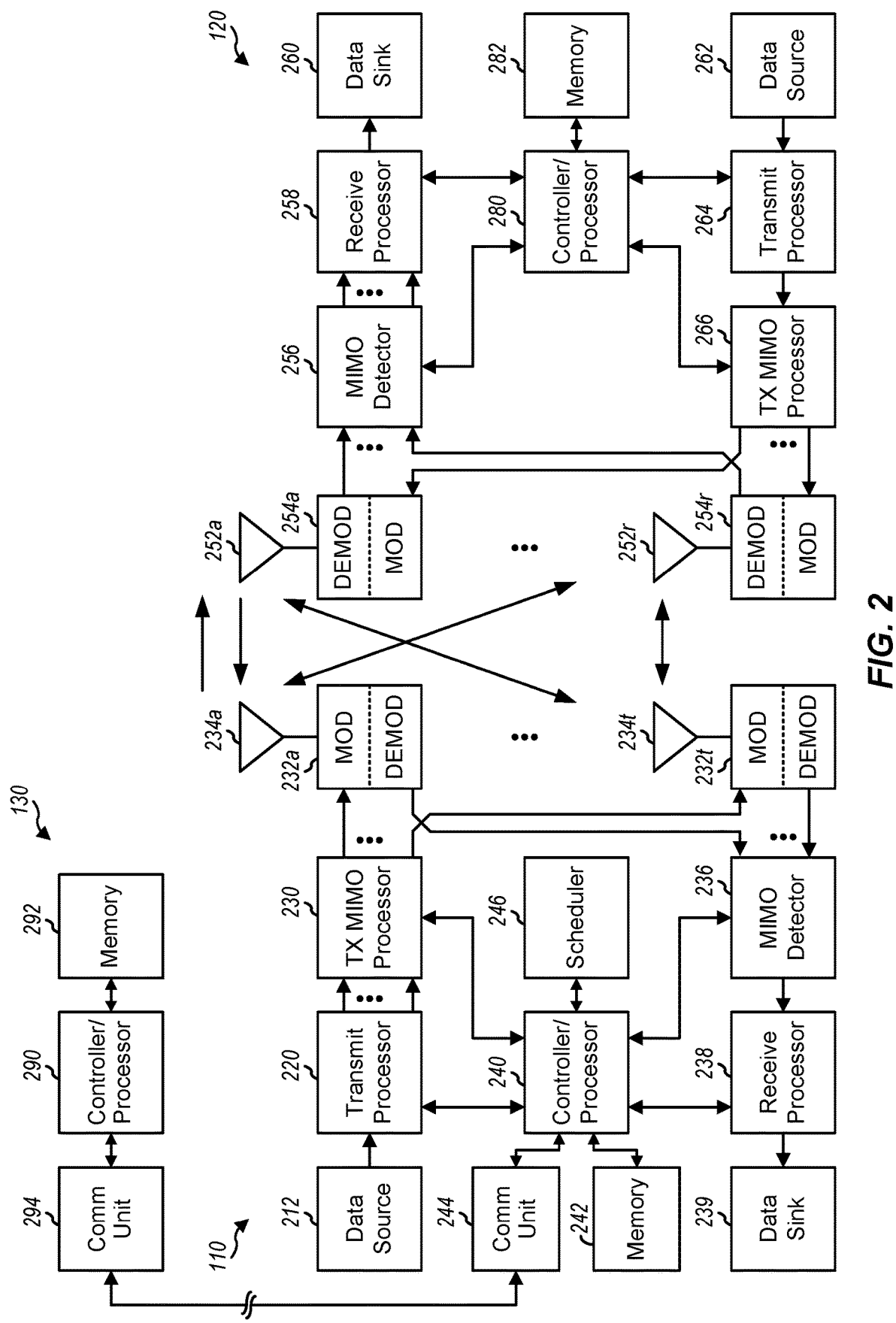
FIG. 2 shows a block diagram conceptually illustrating an example of a base station (BS) in communication with a user equipment (UE) in a wireless communications network, in accordance with certain aspects of the present disclosure.

FIG. 2 shows a block diagram of a design of base station/Node B 110 and UE 120, which may be one of the base stations/Node B and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, Rnn, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively, to perform techniques presented herein for semi-persistent measurement reference symbol (MRS) configuration and measurement.

One or more modules illustrated in FIG. 2 may be configured to perform the operations described herein and illustrated in FIGS. 6-10. At the eNB, the controller/processor 240, scheduler 246, mod/demod 232, and/or antenna 234 may be configured to perform the recited and described operations. At the UE, the controller/processor 280, mod/ demod 254, and antenna 252 may be configured to perform the recited and described operations.

Memories 242 and 282 may store data and program codes for base station 110 and UE 120, respectively. A scheduler 246 may schedule UEs for data transmission on the downlink and/or uplink.

Figure 3:
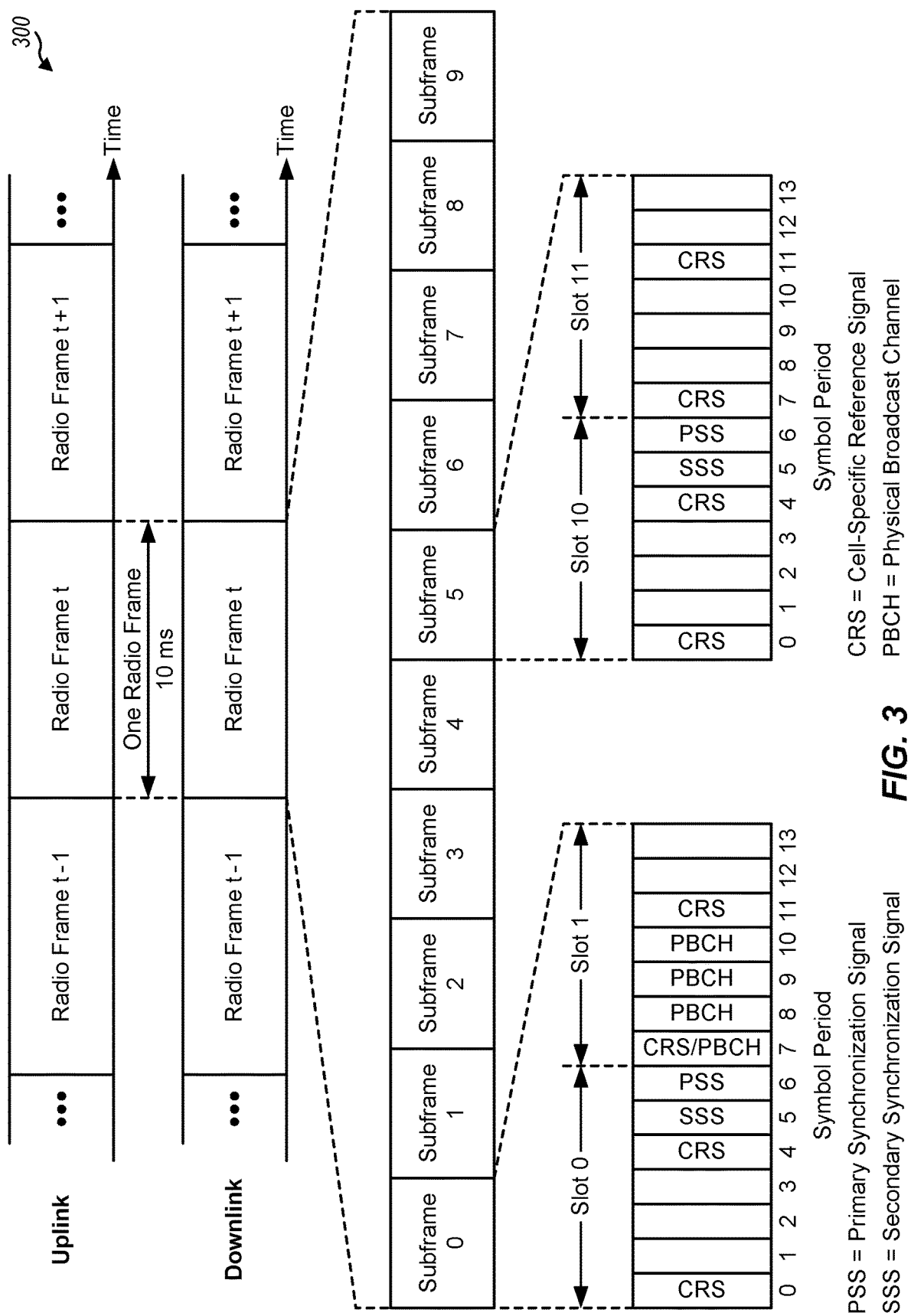
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe. In other systems, a Node B may transmit these or other signals in these locations or in different locations of the subframe.

Figure 4:
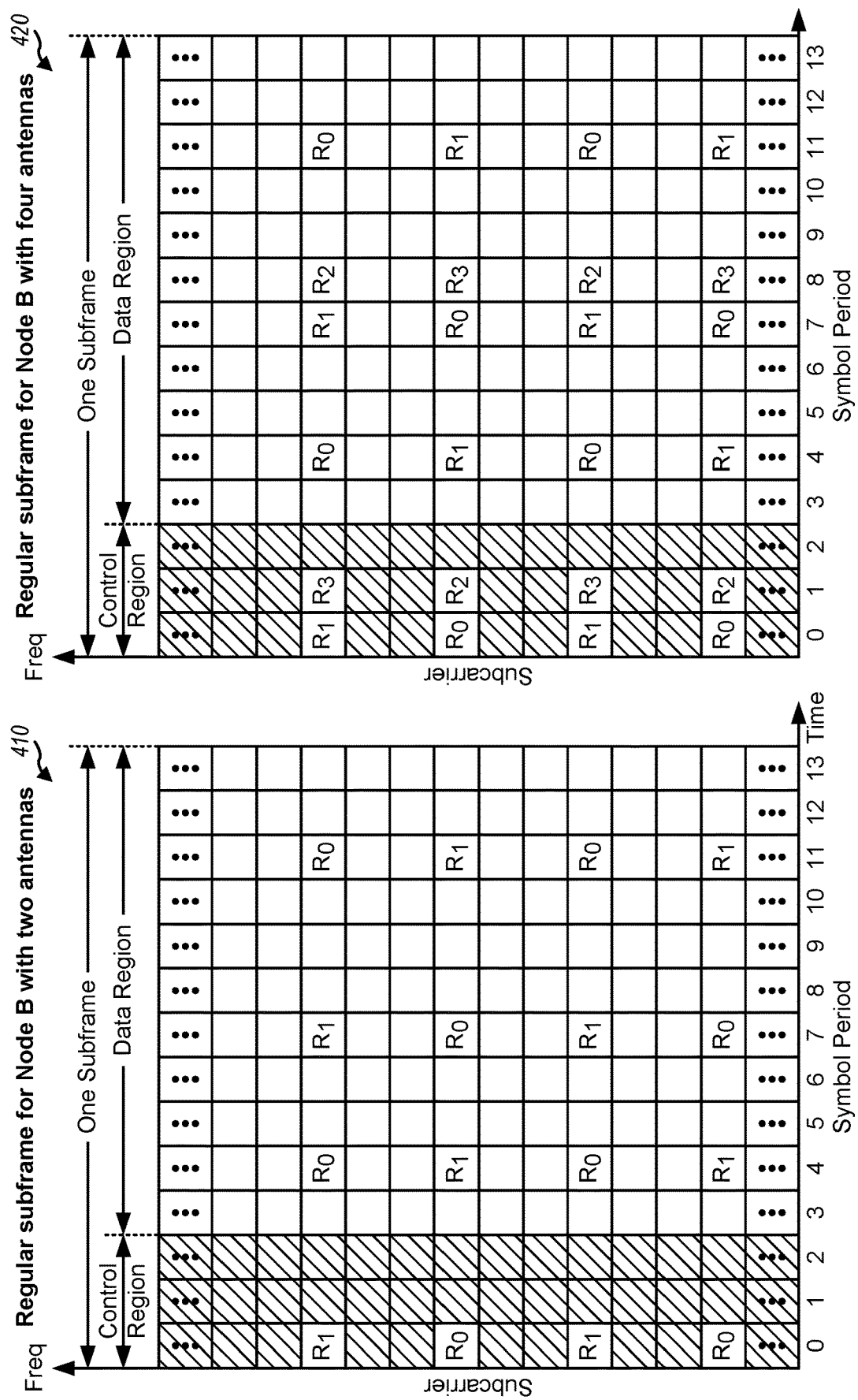
FIG. 4 is a block diagram conceptually illustrating two exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., a Node B) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple Node Bs. One of these Node Bs may be selected to serve the UE. The serving Node B may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering Node Bs.

Figure 4A:
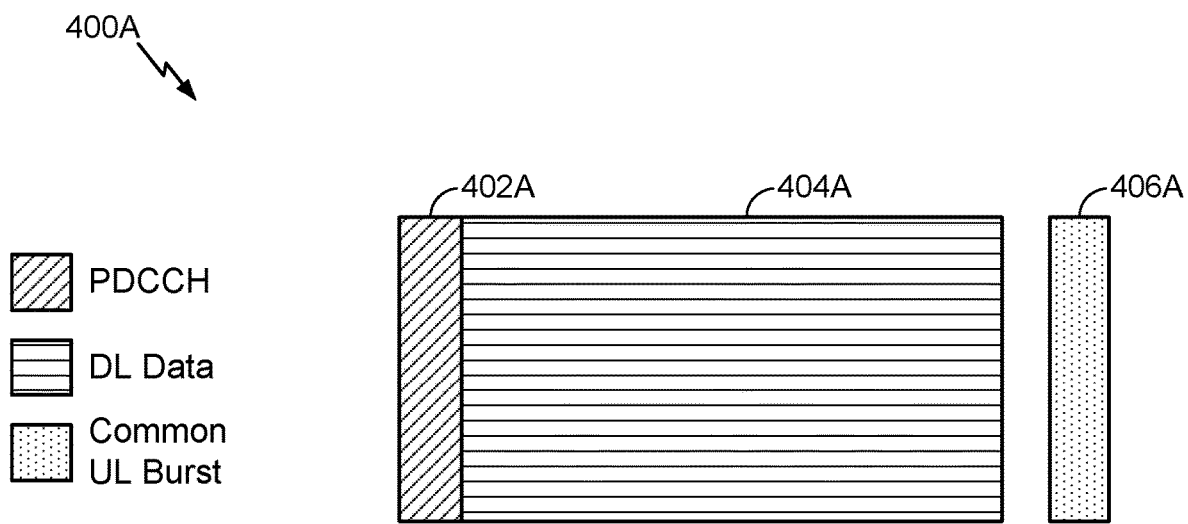
FIG. 4A is a diagram illustrating an example of a downlink (DL)-centric subframe, in accordance with certain aspects of the present disclosure.
Figure 4B:
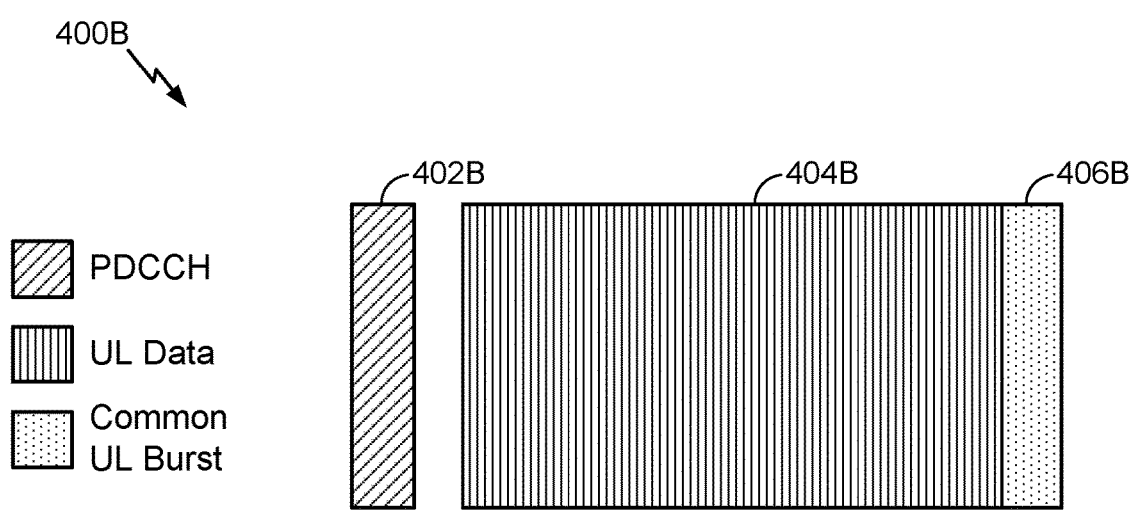
FIG. 4B is a diagram illustrating an example of an uplink (UL)-centric subframe, in accordance with certain aspects of the present disclosure.

In other systems, a Node B may transmit these or other signals in these locations or in different locations of the subframe, for example, as shown in FIGS. 4A and 4B.

An UL centric subframe may be used for transmitting UL data from one or more mobile stations to a base station, and a DL centric subframe may be used for transmitting DL data from the base station to the one or more mobile stations. FIG. 4A is a diagram 400A showing an example of a DL-centric subframe. The DL-centric subframe may include a control portion 402A. The control portion 402A may exist in the initial or beginning portion of the DL-centric subframe. The control portion 402A may include various scheduling information and/or control information corresponding to various portions of the DL-centric subframe. In some configurations, the control portion 402A may be a physical DL control channel (PDCCH), as indicated in FIG. 4A. The DL-centric subframe may also include a DL data portion 404A. The DL data portion 404A may sometimes be referred to as the payload of the DL-centric subframe. The DL data portion 404A may include the communication resources utilized to communicate DL data from the scheduling entity (e.g., eNB, UE, BS, Node B, 5G NB, or TRP) to the subordinate entity (e.g., UE). In some configurations, the DL data portion 404A may be a physical DL shared channel (PDSCH).

The DL-centric subframe may also include a common UL portion 406A. The common UL portion 406A may sometimes be referred to as an UL burst, a common UL burst, and/or various other suitable terms. The common UL portion 406A may include feedback information corresponding to various other portions of the DL-centric subframe. For example, the common UL portion 406A may include feedback information corresponding to the control portion 402A. Non-limiting examples of feedback information may include an ACK signal, a NACK signal, a HARQ indicator, and/or various other suitable types of information. The common UL portion 406A may include additional or alternative information, such as information pertaining to random access channel (RACH) procedures, scheduling requests (SRs), and various other suitable types of information. As illustrated in FIG. 4A, the end of the DL data portion 404A may be separated in time from the beginning of the common UL portion 406A. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

FIG. 4B is a diagram 400B showing an example of an UL-centric subframe. The UL-centric subframe may include a control portion 402B. The control portion 402B may exist in the initial or beginning portion of the UL-centric subframe. The control portion 402B in FIG. 4B may be similar to the control portion 402B described above with reference to FIG. 4A. The UL-centric subframe may also include an UL data portion 404B. The UL data portion 404B may sometimes be referred to as the payload of the UL-centric subframe. The UL portion may refer to the communication resources utilized to communicate UL data from the subordinate entity (e.g., UE) to the scheduling entity (e.g., UE, BS, eNB, Node B, 5G NB, or TRP). In some configurations, the control portion 402B may be a physical UL shared channel (PUSCH). As illustrated in FIG. 4B, the end of the control portion 402B may be separated in time from the beginning of the UL data portion 404B. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 406B. The common UL portion 406B in FIG. 4B may be similar to the common UL portion 406B described above with reference to FIG. 4B. The common UL portion 406B may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., $UE_1$) to another subordinate entity (e.g., $UE_2$) without relaying that communication through the scheduling entity (e.g., eNB, UE, BS, Node B, 5G NB, or TRP), even though the scheduling entity may be utilized for scheduling and/or control purposes. In some examples, the sidelink signals may be communicated using a licensed spectrum (unlike wireless local area networks, which typically use an unlicensed spectrum).

Figure 5:
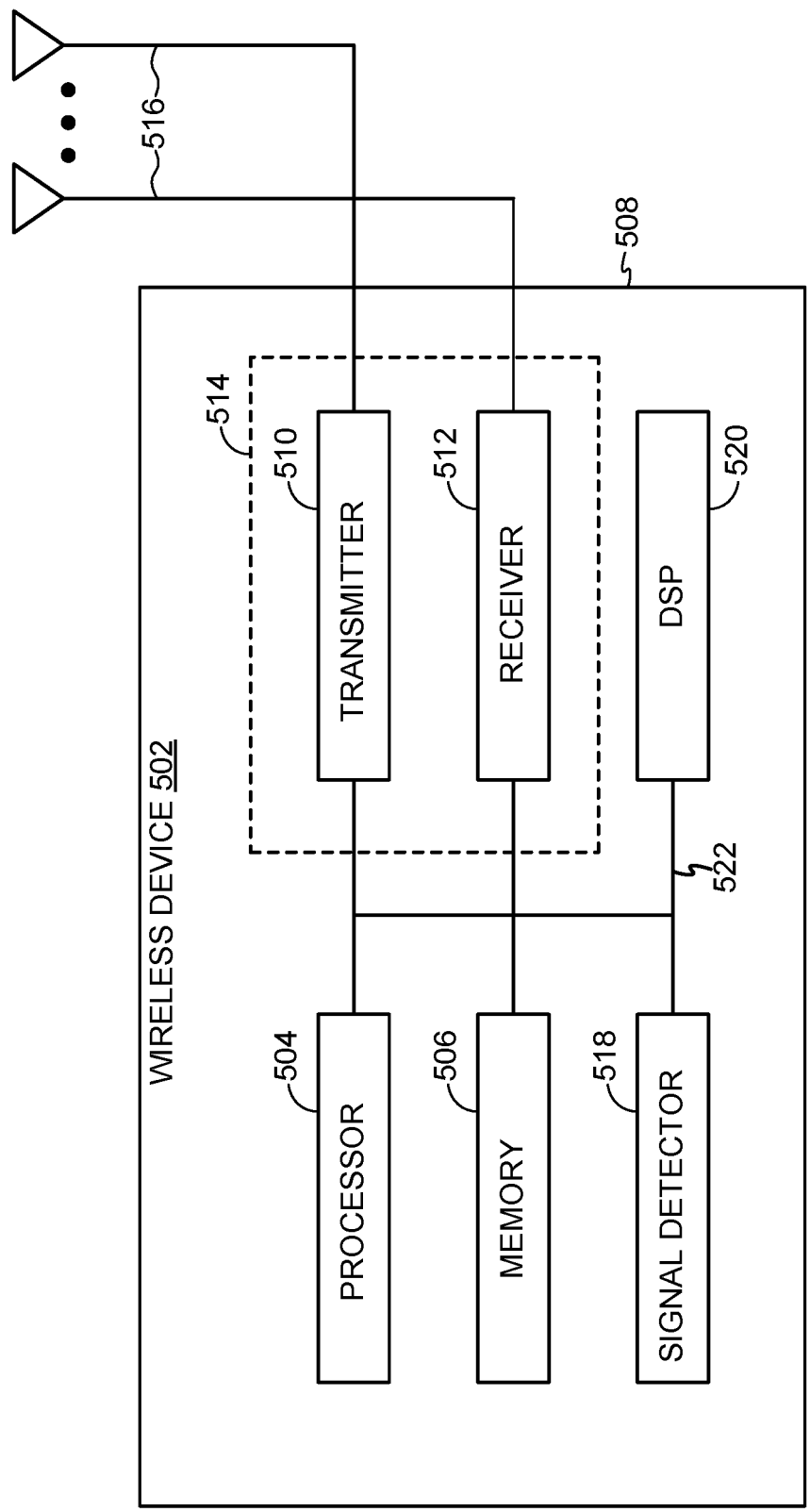
FIG. 5 illustrates various components that may be utilized in a wireless device, in accordance with certain aspects of the present disclosure.

FIG. 5 illustrates various components that may be utilized in a wireless device 502 that may be employed within the wireless communication system 100 illustrated in FIG. 1. The wireless device 502 is an example of a device that may be configured to implement the various methods described herein. The wireless device 502 may be a base station 110 or any of the wireless nodes (e.g., 120). For example, the wireless device 502 may be configured to perform operations 900 illustrated in FIG. 9 as well as other operations described herein.

The wireless device 502 may include a processor 504 that controls operation of the wireless device 502. The processor 504 may also be referred to as a central processing unit (CPU). Memory 506, which may include both read-only memory (ROM) and random access memory (RAM), provides instructions and data to the processor 504. A portion of the memory 506 may also include non-volatile random access memory (NVRAM). The processor 504 typically performs logical and arithmetic operations based on program instructions stored within the memory 506. The instructions in the memory 506 may be executable to implement the methods described herein. Some non-limiting examples of the processor 504 may include Snapdragon processor, application specific integrated circuits (ASICs), programmable logic, etc.

The wireless device 502 may also include a housing 508 that may include a transmitter 510 and a receiver 512 to allow transmission and reception of data between the wireless device 502 and a remote location. The transmitter 510 and receiver 512 may be combined into a transceiver 514. A single transmit antenna or a plurality of transmit antennas 516 may be attached to the housing 508 and electrically coupled to the transceiver 514. The wireless device 502 may also include (not shown) multiple transmitters, multiple receivers, and multiple transceivers. The wireless device 502 can also include wireless battery charging equipment.

The wireless device 502 may also include a signal detector 518 that may be used in an effort to detect and quantify the level of signals received by the transceiver 514. The signal detector 518 may detect such signals as total energy, energy per subcarrier per symbol, power spectral density and other signals. The wireless device 302 may also include a digital signal processor (DSP) 520 for use in processing signals.

The various components of the wireless device 502 may be coupled together by a bus system 522, which may include a power bus, a control signal bus, and a status signal bus in addition to a data bus. The processor 504 may be configured to access instructions stored in the memory 506 to perform beam refinement with aspects of the present disclosure discussed below.

Example NR Architecture

Figure 6:
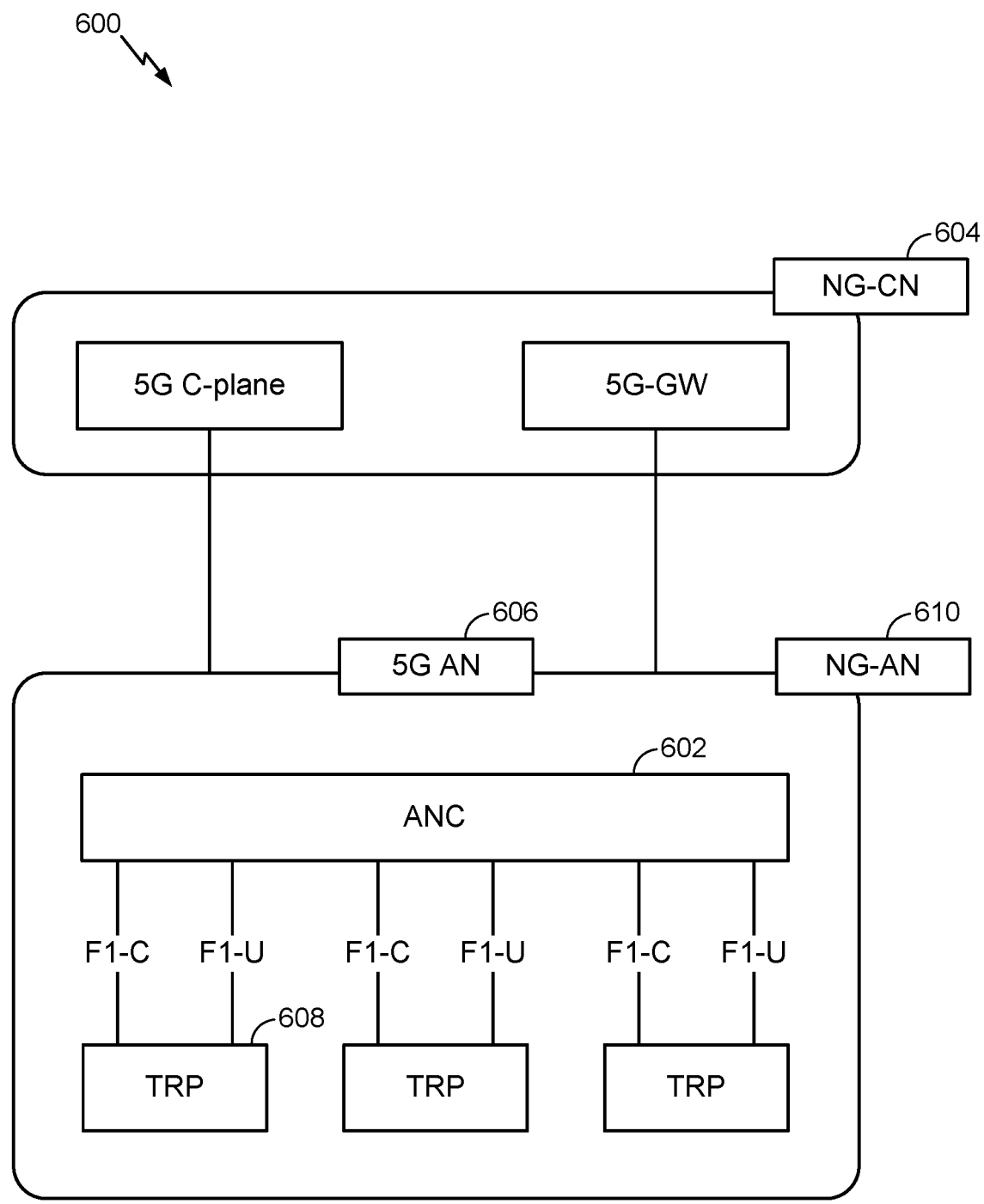
FIG. 6 illustrates a logical architecture of a distributed radio access network (RAN), in accordance with certain aspects of the present disclosure.

FIG. 6 illustrates an example logical architecture of a distributed RAN 600, according to aspects of the present disclosure. A 5G access node 606 may include an access node controller (ANC) 602. The ANC may be a central unit (CU) of the distributed RAN 600. The backhaul interface to the next generation core network (NG-CN) 604 may terminate at the ANC. The backhaul interface to neighboring next generation access nodes (NG-ANs) may terminate at the ANC. The ANC may include one or more TRPs 608 (which may also be referred to as Node Bs, 5G NB, or some other term). As described above, a TRP may be used interchangeably with "cell."

The TRPs 708 may be a distributed unit (DU). The TRPs may be connected to one ANC (ANC 602) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture of a distributed RAN 600 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 610 may support dual connectivity with NR. The NG-AN may share a common fronthaul for LTE and NR.

The architecture may enable cooperation between and among TRPs 608. For example, cooperation may be preset within a TRP and/or across TRPs via the ANC 602. According to aspects, no inter-TRP interface may be needed/present.

According to aspects, a dynamic configuration of split logical functions may be present within the architecture 600. The PDCP, RLC, MAC protocol may be adaptably placed at the ANC or TRP.

Figure 7:
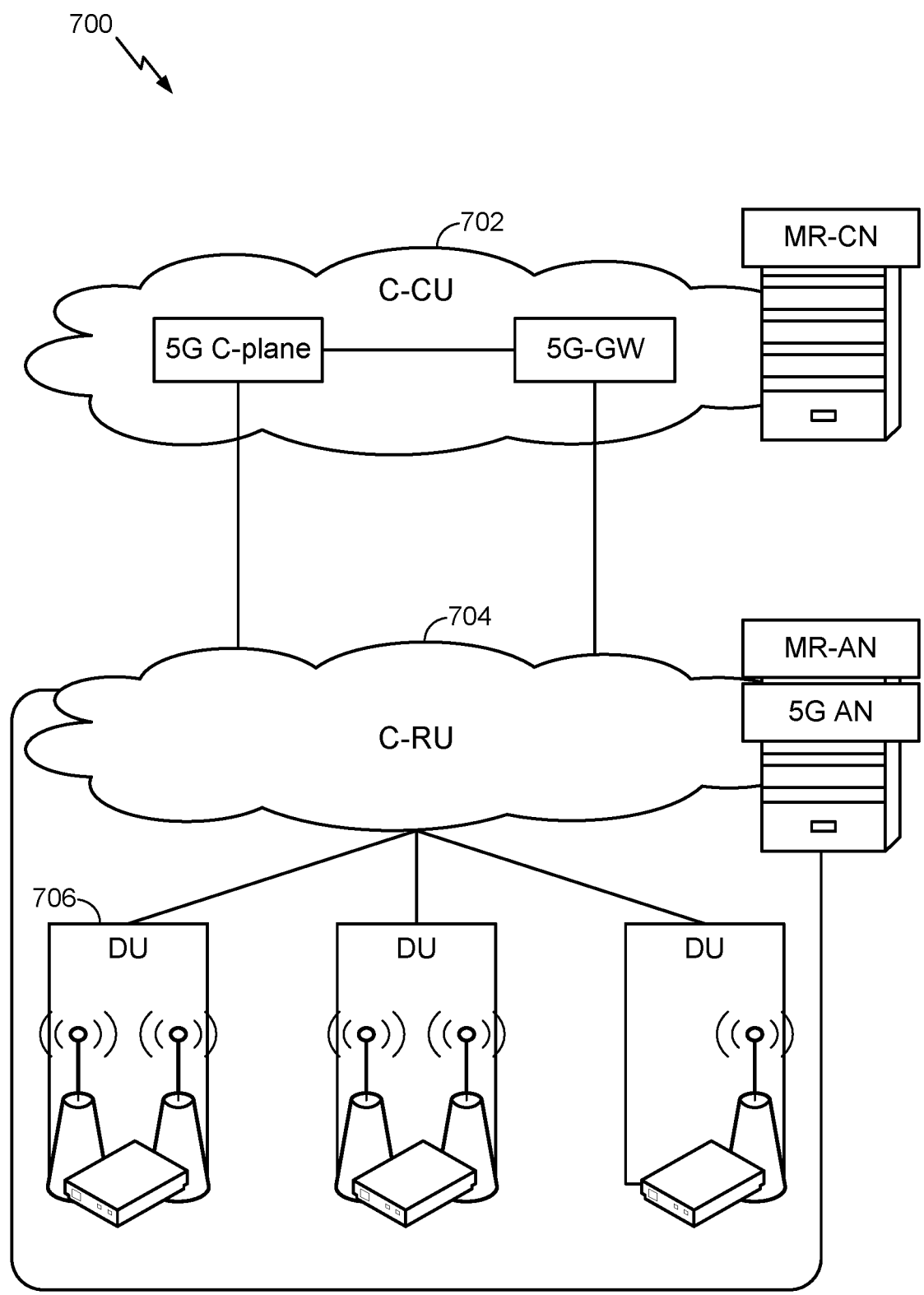
FIG. 7 illustrates an example physical architecture of a distributed RAN, in accordance with certain aspects of the present disclosure

FIG. 7 illustrates an example physical architecture of a distributed RAN 700, according to aspects of the present disclosure. A centralized core network unit (C-CU) 702 may host core network functions. The C-CU may be centrally deployed. C-CU functionality may be offloaded (e.g., to advanced wireless services (AWS)), in an effort to handle peak capacity.

A centralized RAN unit (C-RU) 704 may host one or more ANC functions. Optionally, the C-RU may host core network functions locally. The C-RU may have distributed deployment. The C-RU may be closer to the network edge.

A distributed unit (DU) 706 may host one or more TRPs. The DU may be located at edges of the network with radio frequency (RF) functionality.

Example V2V Sensor Location-Based Data Sharing

Figure 8:
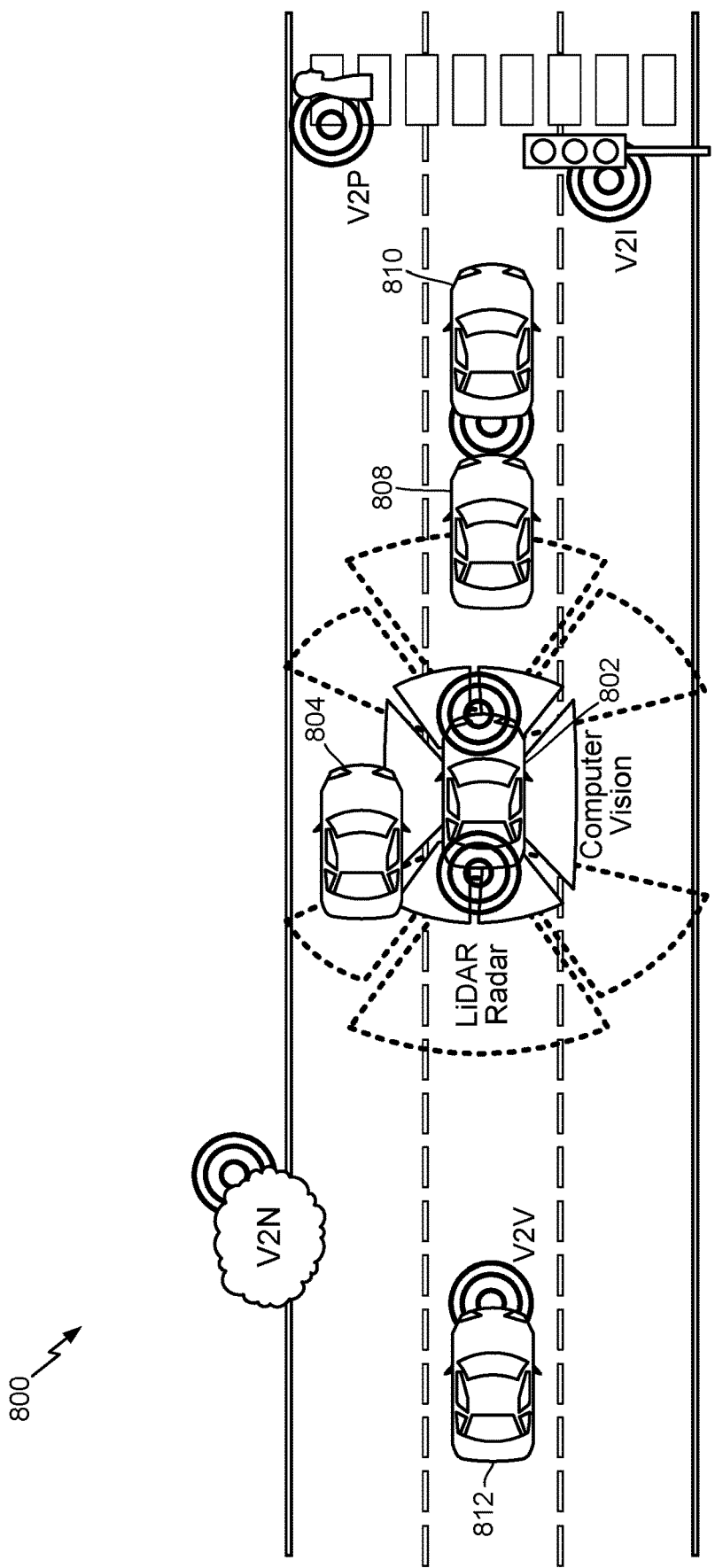
FIG. 8 illustrates an example network environment, in which aspects of the present disclosure may be practiced.

FIG. 8 illustrates an example vehicle to vehicle (V2V) network environment 800, in which aspects of the present disclosure may be practiced. For example, the techniques presented herein may be used to facilitate sharing sensor information between vehicles, such as vehicle 802 and one or more other vehicles 804, 812, 808, and 810.

One or more cases of V2V communications, may provide an always-connected vehicle that may provide a safer, more efficient, more enjoyable driving experience. Communications with different entities may provide different features and/or benefits. For example, Vehicle-to-infrastructure (V2I) communications (e.g., with vehicles communicating with traffic lights) may be used for traffic signal timing, prioritizing, and the like. Vehicle-to-network (V2N) communications may allow for real-time traffic/routing, and cloud services. Vehicle-to-pedestrian (V2P) communications may provide safety alerts to pedestrians, bicyclists, and the like. V2V communications may allow various benefits, such as collision avoidance safety systems.

As illustrated in FIG. 8, V2V systems may provide improved active safety by providing local sensor data collection abilities as well as communication options to communicate with other devices in order to share and receive additional information such as sensor information, identification information, suggested action information, hysteresis information, or other forms of information. For example, vehicle 802 may be provided with sensors and may also be equipped to obtain sensor information from other vehicles 804-812 or other devices or elements in the area such as a pedestrian using V2P and/or a traffic signal element using V2I.

Collectively, this shared sensor information may provide 360° non-line-of-sight awareness, for example, of intersections, on-ramps, and environmental conditions. This may also lead to better traffic efficiency, allowing vehicles to safely drive closer to each other and enables optimization of overall traffic flow, as well as increased situational awareness. Sharing sensor information may also provide the ability to gather data from further ahead to deliver a more predictable driving experience. Direct communications between vehicles may be implemented using any suitable wireless technologies. In some cases, V2V communications may build upon existing technologies (such as LTE Direct device-to-device design), with enhancements for high speeds/high Doppler, high density, improved synchronization and low latency. Ideally, V2V communications allows for proximal direct communications (100s of meters), operates both in- and out-of-coverage, and accommodates latency-sensitive use cases (e.g., V2V safety use cases).

Self-driving cars are an exciting area of innovation these days. One way to help self-driving cars is using V2V communication. FIG. 8 illustrates examples of various sensors that may be used for self-driving, including Lidar, radar, and cameras. Because these sensors are line of sight, the sensors have limitations in the amount of information the sensors may collect and then provide. V2V communication, on the other hand, is not line of sight and can work for non-line of sight cases also. This can be particularly helpful for the case where two vehicles are approaching intersections. V2V communication can be used to share sensor information between vehicles.

However sensor sharing via V2V presents some challenges. For example, for a particular location or geographical area, there may be several vehicles sensing the same information such as an obstacle or a pedestrian. One challenge is to decide which vehicle (or vehicles) should broadcast such information. If all vehicles transmit this information, it can be very inefficient (e.g., with same information being transmitted by multiple vehicles). Sharing sensor information via V2V may also cause the data rate to be very high (e.g., for high definition camera) and it will be challenging to meet such a data rate.

Aspects of the present disclosure provide techniques that may help address these challenges, by utilizing location based sharing of sensor information. According to certain aspects, sensor information is shared using a mapping between a location and the resources used for transmitting information on those locations.

Figure 9:
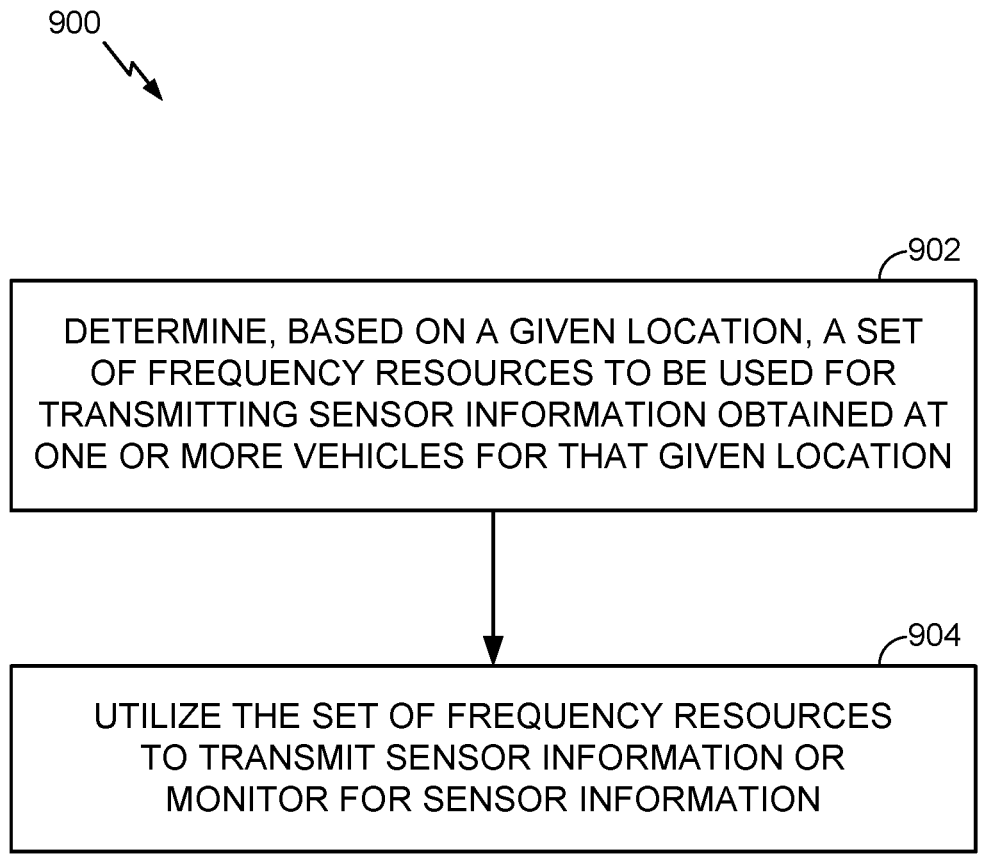
FIG. 9 illustrates example operations that may be performed, at a vehicle, for sharing sensor information, in accordance with certain aspects of the present disclosure.

FIG. 9 illustrates example operations 900 that may be performed, at a vehicle (e.g., one of the vehicles 802-812), for sharing sensor information (with other vehicles), in accordance with certain aspects of the present disclosure. The operations may be performed, for example, by a modem or other type of V2V communication equipment installed on (or integrated in) the vehicle. According to one or more cases, determining the set of frequency resources may be based on a mapping of an area, including the given location, to frequency resources. In some cases, different mappings may be used for different types of sensor information.

Operations 900 begin, at 902, by determining, based a given location, a set of frequency resources to be used for transmitting sensor information obtained at one or more vehicles for that given location. At 904, the set of frequency resources is utilized to transmit sensor information or monitor for sensor information. In some cases, the sensor information may be transmitted using the set of frequency resources in only a subset of time slots.

The given location, for example, may be any location that falls within a rectangular area defined by coordinates $\{(x,y), (x,y+y'), (x+x',y), (x+x',y+y')\}$ that can be mapped to frequency resources. For example, the area may be mapped to frequency resources u and w on the zth slot that occurs periodically (e.g., every 100 slots). Such mapping information may be pre-configured or may be mapped by the network.

One advantage of such an approach is that common information may be transmitted on a given set of resources. So the interference is among vehicles that are transmitting common information, which may help control some of the interference caused due to flooding. Thus, in one case for example, a receiving vehicle on a resource may only need to decode one of the transmissions when it is known that they are transmitting common information. The vehicle may therefore have an option to select from the plurality of transmission only one to decode based on any one or more parameters and/or system information such as signal strength, noise value, error rates, proximity, location, transmitting entity, or any other determining factor or combination thereof. For example, the receiving vehicle may select to decode the signal coming from the closest vehicle. In some cases, the resource size may be set to allow for decoding information at low SNR (e.g., 0 dB or lower).

According to certain aspects, the mapping can be for different types of sensors. For example, the resources for Lidar sensor information can be separate for an area compared to resources used for ultrasound sensors for the area (and similarly for other types of sensors). Again, such mapping information may be pre-configured or mapped by the network.

According to certain aspects, such a mapping may also be used to decide which vehicle should transmit on the resource. The decision may be based on various metrics (such as distance/proximity or direction). For example, deciding whether or not to transmit sensor information about a set of one or more locations on the set of frequency resources associated with those locations may be based on one or more metrics. The one or more metrics may include, for example, a location of one or more of the one or more vehicles capable of transmitting the sensor information.

It may be generally expected that vehicles that are in proximity will send basic safety messages (BSMs) to each other. Such BSMs may contain location of the vehicle along with expected trajectory. If such BSMs can also contain information from sensors being carried by the vehicles, then any given vehicle can receive such information and decide whether it is the closest to an area, among all the vehicles for which it has received the messages. Further, according to one or more examples, the one or more metrics may be derived based on basic safety messages (BSMs) transmitted by the one or more of the vehicles. In some cases, the one or more vehicles may transmit their sensor capability along with BSMs.

In some cases, only if it is the closest to an area will that vehicle transmit information on the resource associated with that area. This approach helps makes sure that there is less collision of signals from vehicles. There are several variants to this approach, however, that involve more than one vehicle transmitting. For example, instead of the closest, the two closest vehicles transmit information on the resource. As another example, only the closest and the farthest vehicle (within a certain distance) transmitting the information (to have better reuse).

Yet another example approach is to have a vehicle (or vehicles) that are closest to an area from a certain direction transmit. For example, vehicles closest to an area from the north/west/east/south side among all other vehicles (for which they have received a BSM) will transmit information about that area.

In some cases, metrics about the sensor information itself may be used to make the decision. For example, a vehicle with the best HD camera may be selected to transmit, even though it is not closest vehicle to an area. In other cases, if bandwidth is an issue, lower resolution sensors may be selected.

Those skilled in the art will appreciate that any combination of these metrics may be considered when deciding which vehicle (or vehicles) will transmit on the resources mapped to a given area.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor.

Generally, where there are operations illustrated in figures, those operations may have corresponding counterpart means-plus-function components.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications performed by a first vehicle, comprising:
   determining, based on a given location, a set of frequency resources in a subset of time slots to be used for transmitting sensor information for the given location, wherein determining the set of frequency resources in the subset of time slots is further based on a mapping of an area, including the given location, to the set of frequency resources and the subset of time slots;
   determining independently, at the first vehicle, based on one or more metrics, whether or not to transmit the sensor information on the set of frequency resources in the subset of time slots, wherein the one or more metrics comprise a location of the first vehicle and a location of a second vehicle, and wherein the second vehicle determines not to transmit the sensor information using the set of frequency resources; and
   utilizing the set of frequency resources in the subset of time slots to transmit the sensor information when it is determined to transmit the sensor information on the set of frequency resources in the subset of time slots.

2. The method of claim 1, wherein the mapping is based on a type of the sensor information.

3. The method of claim 1, further comprising:
deriving the location of the second vehicle based on a basic safety message (BSM) received from the second vehicle.

4. The method of claim 3, wherein the BSM message comprises sensor capability of the second vehicle.

5. The method of claim 1, wherein determining whether or not to transmit the sensor information further comprises comparing the location of the first vehicle with the location of the second vehicle.

6. The method of claim 1, wherein at least a third vehicle also transmits the sensor information on the set of frequency resources in the subset of time slots.

7. The method of claim 6, wherein one of the first vehicle or the third vehicle is closest to the given location and the other is farthest from the given location within a range.

8. The method of claim 1, wherein determining whether or not to transmit the sensor information is based, at least in part, on a closeness of the first vehicle to the given location from a particular direction.

9. The method of claim 1, wherein determining whether or not to transmit the sensor information is based, at least in part, on comparing a sensor capability of the first vehicle with a sensor capability of the second vehicle.

10. A first apparatus for wireless communications, comprising:
means for determining, based on a given location, a set of frequency resources in a subset of time slots to be used for transmitting sensor information for the given location, wherein determining the set of frequency resources in the subset of time slots is further based on a mapping of an area, including the given location, to the set of frequency resources and the subset of time slots;
means for determining independently, at the first apparatus, based on one or more metrics, whether or not to transmit the sensor information on the set of frequency resources in the subset of time slots, wherein the one or more metrics comprise a location of the first apparatus and a location of a second apparatus, and wherein the second apparatus determines not to transmit the sensor information using the set of frequency resources; and
means for utilizing the set of frequency resources in the subset of time slots to transmit the sensor information when it is determined to transmit the sensor information on the set of frequency resources in the subset of time slots.

11. The apparatus of claim 10, wherein the mapping is based on a type of the sensor information.

12. The apparatus of claim 10, wherein the first apparatus further comprises:
means for deriving the location of the second apparatus based on a basic safety message (BSM) received from the second apparatus.

13. The apparatus of claim 12, wherein the BSM message comprises sensor capability of the second apparatus.

14. The apparatus of claim 10, wherein the means for determining whether or not to transmit the sensor information further comprises means for comparing the location of the first apparatus with the location of the second apparatus.

15. The apparatus of claim 10, wherein at least a third apparatus also transmits the sensor information on the set of frequency resources in the subset of time slots.

16. The apparatus of claim 15, wherein one of the first apparatus or the third apparatus is closest to the given location and the other is farthest from the given location within a range.

17. The apparatus of claim 10, wherein determining whether or not to transmit the sensor information is based, at least in part, on a closeness of the first apparatus to the given location from a particular direction.

18. The apparatus of claim 10, wherein determining whether or not to transmit the sensor information is based, at least in part, on comparing a sensor capability of the first apparatus with a sensor capability of the second apparatus.

19. A first apparatus for wireless communications, comprising:
at least one processor configured to:
determine, based on a given location, a set of frequency resources in a subset of time slots to be used for transmitting sensor information for the given location, wherein the at least one processor being configured to determine the set of frequency resources in the subset of time slots is further based a mapping of an area, including the given location, to the set of frequency resources and the subset of time slots;
determine independently, at the first apparatus, based on one or more metrics, whether or not to transmit the sensor information on the set of frequency resources in the subset of time slots, wherein the one or more metrics comprise a location of the first apparatus and a location of a second apparatus, and wherein the second apparatus determines not to transmit the sensor information using the set of frequency resources; and
a transceiver configured utilize the set of frequency resources in the subset of time slots to transmit the sensor information when it is determined to transmit the sensor information on the set of frequency resources in the subset of time slots.

20. A non-transitory computer readable medium for wireless communications having instructions stored thereon that, when executed by a first apparatus, cause the first apparatus to perform a method comprising:
determining, based on a given location, a set of frequency resources in a subset of time slots to be used for transmitting sensor information for the given location, wherein determining the set of frequency resources in the subset of time slots is further based on a mapping of an area, including the given location, to the set of frequency resources and the subset of time slots;
determining independently, at the first apparatus, based on one or more metrics, whether or not to transmit the sensor information on the set of frequency resources in the subset of time slots, wherein the one or more metrics comprise a location of the first apparatus and a location of a second apparatus, and wherein the second apparatus determines not to transmit the sensor information using the set of frequency resources; and
utilizing the set of frequency resources in the subset of time slots to transmit the sensor information when it is determined to transmit the sensor information on the set of frequency resources in the subset of time slots.

* * * * *